(No Model.)
T. J. LITZINGER.
NUT LOCK.
No. 527,179. Patented Oct. 9, 1894.
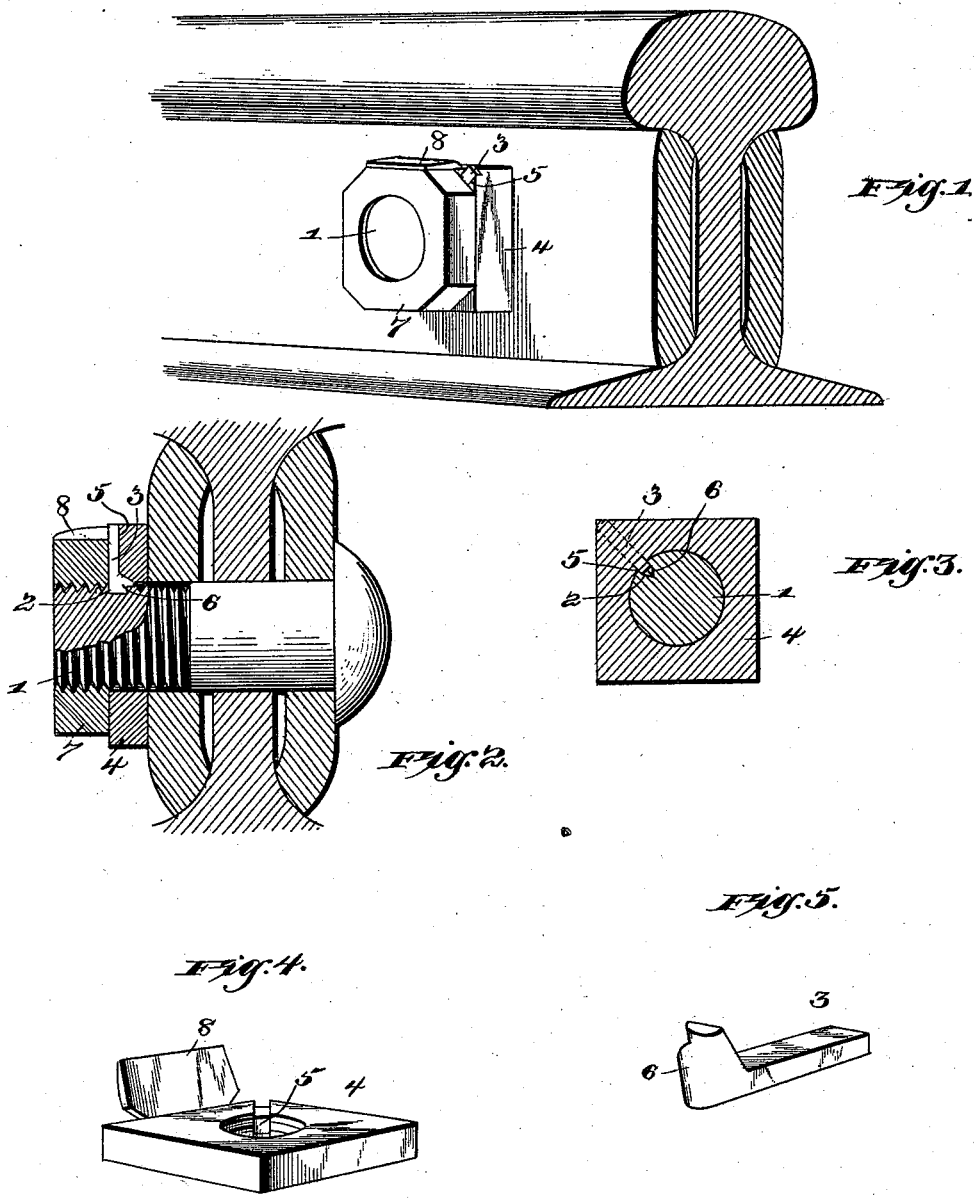
Witnesses
W. H. Doyle
H. J. Riley
Inventor
Thomas J. Litzinger
By his Attorneys
C. A. Snow & Co.

UNITED STATES PATENT OFFICE.

THOMAS J. LITZINGER, OF PATTON, PENNSYLVANIA.

NUT-LOCK.

SPECIFICATION forming part of Letters Patent No. 527,179, dated October 9, 1894.

Application filed August 22, 1894. Serial No. 521,025. (No model.)

*To all whom it may concern:*

Be it known that I, THOMAS J. LITZINGER, a citizen of the United States, residing at Patton, in the county of Cambria and State of Pennsylvania, have invented a new and useful Nut-Lock, of which the following is a specification.

The invention relates to improvements in nut locks.

The object of the present invention is to improve the construction of nut locks, and to provide a simple and effective one capable of securely confining a nut on a bolt, and of holding the same against accidental unscrewing.

A further object of the invention is to provide a nut lock which will be capable of readily releasing a nut when it is desired to remove the same.

The invention consists in the construction and novel combination and arrangement of parts hereinafter fully described, illustrated in the accompanying drawings, and pointed out in the claim hereto appended.

In the drawings: Figure 1 is a perspective view of a nut lock constructed in accordance with this invention. Fig. 2 is a longitudinal sectional view of the same. Fig. 3 is a transverse sectional view. Fig. 4 is a detail perspective view of a locking washer or plate. Fig. 5 is a similar view of the key.

Like numerals of reference indicate corresponding parts in all the figures of the drawings.

1 designates a bolt provided in its threaded portion with a depression or socket 2, adapted to be engaged by a key 3, of a locking plate or washer 4, which is provided with a central bolt-opening and is arranged on the bolt and is adapted to bear against a fish-plate or other part to be bolted. The locking washer is provided at one corner, it being preferably rectangular, with a seat 5, for the key 3; and the seat consists of an L-shaped recess extending diagonally of the front face of the locking plate or washer, and inwardly at the bolt-opening. The locking plate or washer is placed on the bolt and the key 3, which is L-shaped, is inserted in the L-shaped seat; and the said key is provided, at its inner end, with an oppositely-beveled tooth 6, which fits in the depression, socket or recess of the bolt, and thereby locks the plate or washer against rotation. After the locking plate or washer has been arranged on the bolt, and the key arranged in its seat, a nut 7 is screwed on the bolt against the locking plate or washer, and is confined by means of an outwardly-extending flexible flange or wing 8, of the plate or washer. The flange or wing projects from one edge of the plate or washer and is bent down upon the adjacent edge of the nut, thereby securely holding the latter against turning; and when it is desired to remove the nut, the flange or wing is bent outward.

It will be seen that the nut lock is simple and comparatively inexpensive in construction, that it is adapted to be readily applied to an ordinary construction of bolt with but slight change, and that it is capable of securely holding a nut against accidental unscrewing.

Changes in the form, proportion, and the minor details of construction may be resorted to without departing from the principle or sacrificing any of the advantages of this invention.

What I claim is—

In a nut lock, the combination of a bolt provided at its threaded end with a depression or socket, a nut, a locking plate or washer provided with an L-shaped seat consisting of a recess arranged at the front of the plate or washer and extending inward at the bolt-opening thereof, said plate or washer being provided at one of its edges with a flexible wing or flange extending outward and adapted to be bent against the adjacent edge of the nut, and an L-shaped key arranged in the seat of the locking plate or washer and interposed between the same and the nut, and provided at its inner end with an oppositely-beveled tooth engaging the depression or socket of the bolt, substantially as described.

In testimony that I claim the foregoing as my own I have hereto affixed my signature in the presence of two witnesses.

THOMAS J. LITZINGER.

Witnesses:
 RICHARD FURY,
 JESSE E. DALE.